United States Patent [19]

Clavier

[11] Patent Number: 5,194,551
[45] Date of Patent: Mar. 16, 1993

[54] PROCESS FOR MANUFACTURING THERMOSETTING RESINS RESISTANT TO BOILING WATER AND CAPABLE OF BEING SUBSTITUTED FOR PHENOL-FORMOL RESINS, AND RESULTING RESINS

[76] Inventor: Philippe A. Clavier, 27 Avenue de St Germain, 78160 Marly le Roi, France

[21] Appl. No.: 453,906

[22] Filed: Dec. 20, 1989

[30] Foreign Application Priority Data

Dec. 29, 1988 [FR] France ................. 88 17413

[51] Int. Cl.$^5$ ................. C08G 8/04
[52] U.S. Cl. ................. 527/300; 527/303
[58] Field of Search ................. 527/300, 303

[56] References Cited

U.S. PATENT DOCUMENTS

| 1,753,030 | 4/1930 | McIntosh | 527/303 |
| 1,801,052 | 4/1931 | Meigs | 536/43 |
| 4,048,126 | 9/1977 | Gibbons et al. | 260/17.2 |

FOREIGN PATENT DOCUMENTS 612297 10/1926 France.
2625203 6/1989 France.

OTHER PUBLICATIONS

"Hawley's Condensed Chemical Dictionary", 1987, Eleventh Edition, pp. 51, 1014.

Primary Examiner—John Kight, III
Assistant Examiner—Jeffrey C. Mullis
Attorney, Agent, or Firm—Young & Thompson

[57] ABSTRACT

The process allows obtaining thermosetting resins resistant to boiling water. A chemical body having at least two methylol functions per molecule, is reacted with a chemical compound having at least two hydrogen functions per molecule, so as to create polymerization links of the type:

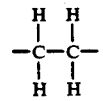

Such resins can be used in particular for manufacturing plywood or chipboards.

15 Claims, No Drawings

PROCESS FOR MANUFACTURING THERMOSETTING RESINS RESISTANT TO BOILING WATER AND CAPABLE OF BEING SUBSTITUTED FOR PHENOL-FORMOL RESINS, AND RESULTING RESINS

FIELD OF THE INVENTION

The present invention is related to a process for manufacturing thermosetting resins by reacting organic compounds having at least two methylol groups and other organic compounds having at least two groups capable of esterifying such methylol groups.

The invention is also related to thermosetting resins obtained in particular from the above-mentioned process.

The presently best known thermosetting resins are the urea-formaldehyde and the phenol-formaldehyde resins.

The resins are obtained by reacting a compound having at least one aldehyde group (formaldehyde) and a compound having at least one hydrogen group (urea or phenol).

These resins are commonly used in the manufacture of plywood and of chipboards made with wood fibers or sawdust conglomerated with a resin of the type described above.

The urea-formaldehyde resin does not resist the action of water. It is the reason why it cannot be used within materials intended to resist water. The phenol-formaldehyde resin is resistant to water but is more expensive than the former.

It has been shown recently that formaldehyde vapors are carcinogenic. As the resins made with formaldehyde are never completely polymerized, and always release some formaldehyde vapor, such resins pose the risk of cancer.

This is why there is presently an ongoing searched to find resins which could replace the above-mentioned urea or phenol-formaldehyde resins without exhibiting the noxiousness of the latter. However, the suitable resins which are presently known are much more costly than the formaldehyde-based ones.

The object of the present invention is thus to propose a process for manufacturing resins capable of replacing the presently known formaldehyde resins and of showing properties at least as interesting as those of the formaldehyde resins while being economically more advantageous.

DESCRIPTION OF RELATED ART

In the French Patent Application No. 2 625 203 dated Dec. 23rd, 1987, the present inventor has previously answered this object by replacing formaldehyde with bodies having aldehyde groups and, in particular, so called primary sugars such as glucose and galactose. According to the afore-mentioned French Patent Application, the sugars are preferably extracted from agricultural by-products, in particular from whey, notably from the whey produced in the manufacture of cheese.

This whey contains, depending on its source, from 5 to 13% by weight of solids consisting essentially of lactose, proteins and mineral salts.

The whey is actually of little economic value, and may be used for instance as hogfeed. The whey is, in any case, produced in quantities which vastly exceed the demand. Furthermore, it cannot be thrown away, as it is considered to be a pollutant, because it removes the oxygen trapped in water.

Thanks to the afore-mentioned invention, the whey finds a worthwhile economic value insofar as it can be used as base material in the manufacture of resins which favorably compare with the known urea-formaldehyde and phenol-formaldehyde resins.

The lactose contained in the whey, indeed, is transformed through hydrolysis into glucose and galactose which have an aldehyde group and thus can react with an organic compound having a hydrogen group, such as for instance urea or phenol, to produce a thermosetting resin which is in no way harmful.

Unfortunately, the gluings obtained by using such resins remain relatively weak in the presence of boiling water.

SUMMARY OF THE INVENTION

The present invention remedies this drawback while using adequate agricultural by-products. It also has the advantage of avoiding the hydrolysis of such by-products, a rather costly process.

The agricultural by-products used in the invention must contain a sufficient amount of chemical bodies, the molecules of which comprise at least two methylol groups. Such chemical bodies are for example higher order sugars such as lactose, maltose, saccharose and also, for example, cellulose and starch.

It is to be noted that these chemical bodies are forming within themselves links between their methylol groups, links that would be destroyed by hydrolysis. It is possible, on the contrary, to maintain these links while creating new links between methylol groups from different molecules of these chemical bodies. It is necessary, for this purpose, to mix with the afore-mentioned chemical body other bodies the molecules of which contain at least two hydrogen groups that can react with the methylol groups of the afore-mentioned compounds.

It is to be noted that the methylol groups of the afore-mentioned chemical bodies are weak. They, for example, do not combine with each other to form polymerization links of the type:

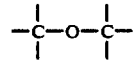

According to the invention, a reaction is produced between a chemical body, or a compound comprising a chemical body having at least two methylol groups per molecule, and a chemical compound having at least two hydrogen groups per molecule, so as to create polymerization links of the type:

Tests have shown that the resins thus obtained, which have such polymerization links, do resist the action of boiling water.

This result is explained by the fact that the binding energy of the links:

is 18 Kcal/mole. This value exceeds largely the energy of vaporization of water, which is 9 Kcal/mole.

On the contrary, the polymerization links:

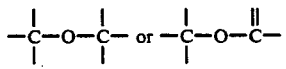

of resins obtained from other processes have a binding energy close to the energy of vaporization of water, which explains their poor resistance to boiling water.

The choice of the usable bodies is further restricted by the following two conditions:

A) stability to heat up to the maximum temperature used in the press during polymerization (125° C. for plywood, 175° C. for chipboards); this condition eliminates, for instance, oxalic and malonic acids.

B) water insolubility: tests have shown, indeed, that the usable bodies that are insoluble in water generate gluings much more resistant to the action of boiling water. But, this is a preference, not a necessity.

It is also necessary to take into consideration the steric hindrance, i.e. the number of polymerization links that can be obtained per volume of resin.

The afore-mentioned agricultural by-products which may be used in the process according to the invention are, in particular, whey from the cheese industry, corn starch, which is overproduced, and any possible cellulose containing by-products.

According to the process of the invention, it is possible in a first step, to concentrate the agricultural by-product so as to obtain a useful density for the body having at least two methylol groups per molecule.

The whey from the cheese factories, which contains in its natural state about 5% solids, can, for instance, be concentrated by vaporization under vacuum until it contains for example 48% solids.

The resulting concentrate is then mixed with an adequate amount of the body having at least two hydrogen groups per molecule. As this body is preferably insoluble, the mixing must be done by adding it in very small amounts at a time and under continuous stirring. The ambient temperature is generally sufficient, but a slightly higher temperature may be preferred if it permits to obtain a better blending.

At the end of this step, the resin is ready for use.

A resin so obtained has a generally acidic pH (for example equal to 4) which is acceptable when the resin is used in contact with varnishes. The pH may however be modified to a more acidic or more basic value by adding a concentrated acid or base, which serve as catalysts for the polymerization. In particular, lactic acid is an efficient catalyst.

The resin thus obtained can be used exactly in the manner of the presently used resins, such as the formophenolic ones.

DESCRIPTION OF THE INVENTION

There will now described, as non limitative example, the implementation of the invention when using whey from cow's milk.

Whey has the following composition by weight:

Proteins: 9.88%
Fats: 3.44%
Lactose: 59.38%
Ashes: 6.12%
Lactic acid: 15.49%
Calcium: 2.27%
Sodium: 0.44%
Chlorides: 1.28%
Phosphorus: 1.20%.

This whey has a pH generally ranging between 4.2 and 5.8 depending on whether it originated from the manufacture of soft, hard or diet cheese.

This whey can be used directly for implementing the invention.

However, it may be of interest to separate the proteins from the whey, which separation is done by ultrafiltration. There is thus obtained an aqueous solution containing solids having approximately the following composition by weight:

Lactose: 80%
Ashes: <16%
Fats: <0.5%
Proteins: 2 to 4%
Mineral salts: <4%.

Before being used, said permeate is concentrated by vaporization under vacuum until it contains 48% solids.

The concentrated permeate is poured in a chemical reactor, at ambient temperature. During the whole operation, the mix must be stirred continuously at, for example, 400 RPM. Nevertheless, good results have also been obtained by stirring at 100 or 200 RPM.

Then lactic acid is added a future catalyst for polymerization.

Then, phenol is poured very slowly into the reactor. This pouring opertion may require one hour.

At the end of the pouring, the mole ratio between the lactose and the phenol should be one to one, eventhough a slight excess of phenol may be preferred.

If stirring of the mix is continued at a temperature of 30° C., the pH and viscosity change.

The pH, which may attain a value of 3.65 when the lactic acid has been added, changes slowly and later more rapidly to reach a value of about 4. The viscosity, which starts at about 110 CPS, reaches 300 CPS and continues, if nothing is stopped, towards very sticky viscosities.

In fact, the operation is stopped before having reached the desired viscosity (which is generally at a temperature of 20° C.) to take into account the fact that the viscosity continues to change during cooling of the resin.

The viscosity at which heating is stopped is determined experimentally. Further, as the viscosity at 60° C. is much smaller than that of the mix when cooled at 20° C., the best control is obtained by choosing a duration of the operation.

The whole mix is resin. There are no byproducts.

The resins obtained according to the invention replace advantageously the formaldehyde resins in the manufacture of inter alia plywood or of chipboards or in the manufacture of decorative laminates based on kraft paper.

During this manufacture, the resin is mixed with sawdust or woodfiber to obtain chipboards, or the resin is applied on wood veneers to obtain plywood.

The resulting pannels are subjected to the action of a heating press in order to polymerize the resin. Said polymerization is never carried out to the end. It is stopped when estimated to be sufficient.

The process is substantially the same in the case of the decorative laminates.

In this case, the resin is spread on sheets of kraft paper which are piled up one above the other in a press.

The choice for the viscosity of the resin before introducing it into the press is determined by two conditions: the viscosity necessary for applying the resin, the duration of the pressing operation.

In addition, it is often useful to add to the resin a small amount (1% for example) of soluble starch in order to facilitate the wetting.

These resins, even though generally acid, do not displace carbon dioxide from chalk, which may be used as filler.

The press cycles must satisfy the following two criteria:

The resin must never be under a pressure at which water boils. At the temperature reached by the resin, if this precaution is not followed, the water included in the resin will start boiling and make the part to be glued split. Nevertheless, when the resin is polymerized, the pressure may be decreased suddenly, provided an adequate amount of resin has been used.

The press cycles can be identical to the ones used with ordinary phenol-formaldehyde resins.

The resins obtained according to the process of the invention show a breaking strength at least equal to that of the formaldehyde-based resins. Furthermore, the resins obtained in accordance with the invention, do not create any risk of releasing noxious vapors such as vapors of formaldehyde or phenol during the life or the manufacture or the use of the finished product in which they are incorporated.

Objects glued with the resins of the invention are boiling water resistant (for example during a test duration of 78 hours) provided a sufficient proportion of resin is used (for example 400 g/m² in the case of plywood) and that the application of the resin is carried out with sufficient care (which is the case in the industry).

Of course, the invention is not limited to the examples of embodiments that have just been described, and many changes may be made to said embodiments without departing from the scope of the invention.

Thus, the invention relates to the manufacture of thermosetting resins made from any agricultural by-product or other compound containing a chemical body having at least two methylol groups per molecule which can react with a compound having at least two hydrogen groups per molecule.

I claim:

1. A process for manufacturing thermosetting resins, capable of being substituted for phenol-formaldehyde resins, which comprises: reacting by mixing at about ambient temperature a carbohydrate or a compound containing a useful amount of a carbohydrate having at least two methylol groups per molecule with another organic chemical compound having per molecule at least two hydrogen groups which are each directly bonded to a carbon atom so as to obtain a polymerized resin having polymerization links of the type

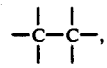

and which is resistant to boiling water.

2. A process according to claim 1, wherein the carbohydrate or the carbohydrate-containing compound which has at least two methylol groups per molecule is an agricultural by-product.

3. A process according to claim 2, wherein said agricultural by-product is selected from the group consisting of whey, corn starch and cellulose-containing by-products.

4. A process according to claim 1, wherein the organic compound which has at least two hydrogen groups is phenol.

5. A process according to claim 1, wherein the organic compound which has at least two hydrogen groups is thermally stable during polymerization.

6. A process according to claim 1, wherein the reaction is carried out at ambient temperature while continuously stirring the two reactants.

7. A process according to claim 1, wherein lactic acid is added to the reaction as a catalyst for the polymerization.

8. A process according to claim 1, wherein the carbohydrate or the carbohydrate-containing compound which has at least two methylol groups per molecule is selected from the group consisting of lactose, maltose, saccharose, higher order sugars, cellulose and starch.

9. A process for manufacturing thermosetting resins, capable of being substituted for phenol-formaldehyde resins, which comprises: reacting by mixing at about ambient temperature a carbohydrate or a compound containing a useful amount of a carbohydrate having at least two methylol groups per molecule with phenol so as to obtain a polymerized resin having polymerization links of the type

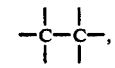

and which is resistant to boiling water.

10. A process according to claim 9, wherein the carbohydrate or the carbohydrate-containing compound which has at least two methylol groups per molecule is an agricultural by-product selected from the group consisting of whey and corn starch.

11. A process according to claim 9, wherein the carbohydrate or the carbohydrate-containing compound which has at least two methylol groups per molecule is selected from the group consisting of lactose, maltose, saccharose, higher order sugars, cellulose and starch.

12. A process according to claim 9, wherein the reaction is carried out at ambient temperature while continuously stirring the two reactants.

13. A process according to claim 9, wherein lactic acid is added to the reaction as a catalyst for the polymerization.

14. Thermosetting resins capable of being substituted for phenol-formaldehyde resins, obtained by mixing at about ambient temperature, a carbohydrate or a compound containing a useful amount of a carbohydrate having at least two methylol groups per molecule with another organic chemical compound having per molecule at least two hydrogen groups which are each directly bonded to a carbon atom, said thermosetting resins having polymerization links of the type

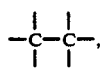

and being resistant to boiling water.

15. Thermosetting resins capable of being substituted for phenol-formaldehyde resins, obtained by mixing, at about ambient temperature, a carbohydrate or a compound containing a useful amount of a carbohydrate having at least two methylol groups per molecule with phenol, said thermosetting resins having polymerization links of the type

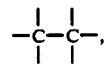

and being resistant to boiling water.

* * * * *